(12) United States Patent
Cuvelier et al.

(10) Patent No.: US 12,071,001 B2
(45) Date of Patent: Aug. 27, 2024

(54) CONNECTING DEVICE BETWEEN A LIQUID TANK MADE OF PLASTIC MATERIAL AND A LIQUID DELIVERY MODULE ON BOARD OF A VEHICLE

(71) Applicant: Plastic Omnium Advanced Innovation and Research, Brussels (BE)

(72) Inventors: Vincent Cuvelier, Brussels (BE); Charbel Nahed, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 17/434,528

(22) PCT Filed: Feb. 26, 2020

(86) PCT No.: PCT/EP2020/054985
§ 371 (c)(1),
(2) Date: Aug. 27, 2021

(87) PCT Pub. No.: WO2020/173979
PCT Pub. Date: Sep. 3, 2020

(65) Prior Publication Data
US 2022/0134872 A1    May 5, 2022

(30) Foreign Application Priority Data
Feb. 28, 2019   (EP) .................................. 19160135

(51) Int. Cl.
*F02M 37/10* (2006.01)
*B60K 15/03* (2006.01)

(52) U.S. Cl.
CPC ..... *B60K 15/03177* (2013.01); *F02M 37/103* (2013.01); *B60K 2015/03111* (2013.01);
(Continued)

(58) Field of Classification Search
CPC .... B60K 15/03177; B60K 2015/03111; B60K 2015/03243; B60K 13/04; F02M 37/103; F02M 37/106
(Continued)

(56) References Cited

U.S. PATENT DOCUMENTS 3,530,882 A * 9/1970 Case .................. F16K 24/00
                                                          137/202
4,354,521 A   10/1982 Harde
(Continued)

FOREIGN PATENT DOCUMENTS

AU    2013209327 A1   5/2014
AU    2014221318 A1   3/2016
(Continued)

OTHER PUBLICATIONS

International Search Report issued Jun. 24, 2020 in PCT/EP2020/054985 filed Feb. 26, 2020, 4 pages.

*Primary Examiner* — Logan M Kraft
*Assistant Examiner* — Joshua Campbell
(74) *Attorney, Agent, or Firm* — Oblon, McClelland, Maier & Neustadt, L.L.P.

(57) ABSTRACT

The present invention related to a connecting device (1) between a liquid tank made of plastic material (2) and a Liquid Delivery Module (3) on board of a vehicle. According to the invention said connecting device (1) comprises a tubular member (10) It provided to be inserted into the liquid tank (2), said tubular member (10) having a first end portion (100) and a second end portion (101) provided to constitute a swirl pot (4), and a flange (11) located on the external part of the tubular member (10), a surface (110) of the flange (11) being provided to be welded to an external surface of a tank wall (2), the connecting device (1) comprising a connecting means (12) on the first end portion (100) of the tubular member (10), said first end portion (100) being located on (Continued)

the tubular member (10) relative to the flange (11) on the other side of the flange surface (110) provided to be welded to the liquid tank (2), said connecting means (1) being provided for the fixing of the Liquid Delivery Module (3) to the tubular member (10), the second end portion (101) of the tubular member (10) comprising an opening (1010) provided to allow entry of the liquid in the tubular member (10), the first end portion (100) comprising an opening (1000) provided for the insertion of the Liquid Delivery Module (3).

16 Claims, 7 Drawing Sheets

(52) U.S. Cl.
CPC ............... *B60K 2015/03243* (2013.01); *B60K 2015/0346* (2013.01)

(58) Field of Classification Search
USPC ........................................................ 123/495
See application file for complete search history.

(56) References Cited

U.S. PATENT DOCUMENTS

| | | | | |
|---|---|---|---|---|
| 5,687,756 A | * | 11/1997 | VanNatta | F02M 25/0809 251/86 |
| 5,988,213 A | * | 11/1999 | Yoshioka | F02M 37/106 137/590 |
| 6,058,963 A | * | 5/2000 | Enge | F02M 25/0809 137/202 |
| 6,065,452 A | * | 5/2000 | Yoshioka | F02M 37/46 123/509 |
| 6,253,790 B1 | * | 7/2001 | Hara | B62J 35/00 137/565.17 |
| 6,401,750 B2 | * | 6/2002 | Tokunaga | B62J 35/00 137/574 |
| 7,383,822 B2 | * | 6/2008 | Ramamurthy | F02M 37/0029 123/495 |
| 7,412,971 B2 | * | 8/2008 | Stewart | F02M 59/48 123/495 |
| 8,763,589 B2 | * | 7/2014 | Lim | F02M 37/025 123/495 |
| 2007/0062841 A1 | * | 3/2007 | Nakamura | B60K 15/03177 206/562 |
| 2009/0134175 A1 | * | 5/2009 | Bleuel | B60K 15/077 220/564 |
| 2013/0153319 A1 | | 6/2013 | Kawano et al. | |
| 2016/0341092 A1 | * | 11/2016 | Daragon | F01N 3/2066 |
| 2017/0015468 A1 | * | 1/2017 | Loffink | B60K 15/03 |
| 2017/0159527 A1 | * | 6/2017 | Brück | F01N 13/1827 |

FOREIGN PATENT DOCUMENTS

| | | | | |
|---|---|---|---|---|
| AU | 2014221318 B2 | * | 4/2020 | |
| CN | 108368764 A | | 8/2018 | |
| DE | 10 2009 042 510 A1 | | 3/2011 | |
| DE | 102009042510 A1 | * | 3/2011 | ........... F01N 3/2066 |
| JP | 2007-186119 A | | 7/2007 | |
| JP | 2007186119 A | * | 7/2007 | |
| JP | 2014-91337 A | | 5/2014 | |
| JP | 2016-222089 A | | 12/2016 | |
| KR | 10-2013-0036980 A | | 4/2013 | |
| KR | 20130036980 A | * | 4/2013 | |
| WO | WO 2018/072558 A1 | | 4/2018 | |

\* cited by examiner

CONNECTING DEVICE BETWEEN A LIQUID TANK MADE OF PLASTIC MATERIAL AND A LIQUID DELIVERY MODULE ON BOARD OF A VEHICLE

The present invention relates to a connecting device between a liquid tank made of plastic material and a Liquid Delivery Module on board of a vehicle, said connecting device being provided to form a swirl pot. The invention relates also to a liquid tank made of plastic material comprising said connecting device and to a method for manufacturing a liquid tank made of plastic material comprising said connecting device.

Liquid Delivery Modules (LDM) on board of vehicle are generally equipped with a swirl pot that holds the liquid close to the pump inlet. In an automotive vehicle, the swirl pots ensure a constant supply of liquid under harsh cornering and braking forces, minimizing the risk of liquid pump failure due to liquid starvation and insuring the delivering of liquid to other parts of the vehicle such as the engine or the depollution system.

Due to high development costs of Liquid Delivery Modules (LDM), manufacturers tend to standardize this component. In case of standardization, the swirl pot of the Liquid Delivery Module will have a fixed design that sometimes does not accommodate with the shape of the tank. For example, the height of the tanks might be too low compared to the height of a standardized swirl pot, and reducing the height of the swirl pot just for those low profile tanks will penalize the performance of the Liquid Delivery Module (LDM). Alternatively, an LDM without swirl pot can be used in conjunction with an injected tank. In an injected tank, the swirl port and the tank constitute a monoblock assembly, the swirl pot being a part the tank obtained during the manufacture of the tank shell. Nevertheless, the investments for injected tanks are very expensive and not always a viable option when considering the business case.

US 2009/0134175 discloses a specific swirl pot inserted during a blow molding method requiring a specific blow molding machine. Unfortunately, the method and machine disclosed lead to high investments killing the profitability of such solution.

The invention aims at providing a swirl pot and a method to manufacture a tank made of plastic material comprising said swirl pot that do not show the above problems.

In particular, it is a first objective of the invention to provide a connecting device between a liquid tank made of plastic material and a Liquid Delivery Module on board of a vehicle, said connecting device being provided to form a swirl pot.

A second objective of the present invention is also to provide a liquid tank made of plastic material comprising said connecting device.

A third objective of the present invention is to provide a manufacturing method of a liquid tank made of plastic material comprising said connecting device.

According to a first embodiment of the invention, these objectives are reach with a connecting device between a liquid tank made of plastic material and a Liquid Delivery Module on board of a vehicle, wherein said connecting device comprises a tubular member provided to be inserted into the liquid tank, said tubular member having a first end portion and a second end portion provided to constitute a swirl pot, and a flange located on the external part of the tubular member, a surface of the flange being provided to be welded to an external surface of a tank wall, the connecting device comprising a connecting means on the first end portion of the tubular member, said first end portion being located on the tubular member relative to the flange on the other side of the flange surface provided to be welded to the tank, said connecting means being provided for the fixing of the Liquid Delivery Module to the tubular member, the second end portion of the tubular member comprising an opening provided to allow entry of the liquid in the tubular member, the first end portion comprising an opening provided for the insertion of the Liquid Delivery Module.

The connecting device according to the invention allows creating a swirl pot comprising a Liquid delivery Module adaptable to various tank dimensions.

According to a preferred embodiment of the invention, the connecting means on the first end portion of the tubular member being provided for the fixing of the Liquid Delivery Module to the tubular member is an assembly means comprising a seal. Preferably, the assembly means comprising a seal is selected from the group consisting of a mason jar, a cam-lock and an inverted cam-lock. A connecting means provided for the fixing of the Liquid Delivery Module to the tubular member comprising an assembly means comprising a seal ensures the serviceability of the Liquid Delivery Module as said module can be dismounted from the tank made of plastic material.

According to a particular embodiment of the invention, the flange of the connecting device is located close to the first end portion of the tubular member. A flange located close to the first end portion permits to obtain a compact assembly comprising a tank, a connecting device and a Liquid Delivery Module. Moreover, it permits also to obtain a less protruding Liquid Delivery Module outside the tank made of plastic material. By the expression "close to the first end portion", we intend to mean that the flange can be located directly on the first end portion of the tubular member or near said first end portion.

According to a particular embodiment of the invention, the second end portion of the tubular member comprises at least a slit and/or a sloped upper part. A second end portion of the tubular member comprising at least a slit and/or a sloped upper part permits a feeding by the liquid inside the tank once the liquid level goes below the second end portion of the tubular member. By the expression "the second end portion of the tubular member comprises at least a slit", we intend to mean that a slit starts from the second end portion of the tubular member, said slit being not limited to the said second end portion.

According to a preferred embodiment of the invention, the tubular member of the connecting device has a circular section. A connecting device having a circular section permits an ideal fitting with the circular opening habitually performed in the tank made of plastic material. Said opening in the tank made of plastic material is usually made with a boring operation.

According to a preferred embodiment of the invention, the Liquid Delivery Module comprises a pump configured to pump liquid from the swirl pot and to deliver it to a supply line, preferably via a hydraulic connector. Preferably, the Liquid Delivery Module and/or the swirl pot comprises a heating element, preferably a flexible heating element. Such a heating element allows thawing of the liquid contained in the swirl pot when the liquid is in a frozen state. The Liquid Delivery Module and/or the swirl pot incorporates (that is to say, is equipped with) a heating element having at least one flexible part. The qualifier "flexible" is in fact understood to mean "easily deformable", this generally being in a reversible manner. Generally, this corresponds to a flexural rigidity (defined as being equal to $(Eh^3)/(12(1-v^2))$ where E is the Young's modulus of the flexible part measured according to the ASTM D790-03 standard, h is its thickness and ν is the Poisson's ratio of its constituent material) below 4000 N·m; preferably, in the context of the invention, the rigidity of the flexible part is less than or equal to 1000 N·m, or 100 N·m or even 10 N·m and most particularly preferably, less than or equal to 1 N·m. Preferably, this flexible part is a flexible heater, that is to say a heater comprising one or more resistive track(s) affixed to a film or placed between two films (that is to say two substantially flat supports, the material and thickness of which are such that they are flexible). This film is preferably made of a plastic (although any other insulating material may be suitable) and, in particular, is based on an elastomer. Reference will subsequently generally be made to several resistive tracks. In this variant, for the flexural rigidity calculation defined above, the Poisson's ratio will preferably be taken to be that of the constituent material of the film or films. The resistive tracks may be based on metal, carbon, etc. or even a combination of such conductive materials. They are generally metallic (and most particularly preferably, made of a urea-resistant metal such as a stainless steel). They are generally sandwiched between two flexible films. They are applied (for example, by jet printing techniques) onto a flexible film and then covered with another flexible film or overmoulded using an insulating (preferably elastomeric) material. The two films are then firmly attached together (for example, by vulcanization) to ensure sealing around the resistive tracks. These tracks are preferably connected in parallel so that if one of the tracks is damaged, it does not impede the operation of the other tracks. The flexible films may be made of silicone resin, polyolefin (polyethylene or polypropylene), thermoplastic elastomer (or TPE), polyester, polyimide (such as the KAPTON® resin), etc. Preferably, they are based on silicon, polyolefin or TPE considering the fact that polyester and polyimide have a lower resistance to urea, particularly at high temperature. The flexible films may also comprise several superposed layers of resistors (resistive tracks). They may also comprise a glass-fibre coating to improve their mechanical strength. Stainless steel resistive tracks sandwiched between two silicone resin films, one of which is covered with a network of glass fibres, give good results.

According to a preferred embodiment of the invention, the connecting device, preferably the swirl pot, comprises an upper mechanical protection means for a flexible heater, preferably for a flexible heater of the Liquid Delivery Module. Preferably, the upper mechanical protection means comprises an abutment.

According to a preferred embodiment of the invention, a plurality of ribs is provided between the internal diameter of the first end portion and the internal diameter of the second end portion, in order to reinforce the structural resistance of the connecting device.

According to a preferred embodiment of the invention, the second end portion further comprises an upper mechanical protection means, for example an abutment or a finger. Those upper mechanical protection means are provided to protect a part of the Liquid Delivery Module, this part being preferably a heating element, which heating element has preferably at least one flexible part. Thus, the upper mechanical protection means prevents the part of the Liquid Delivery Module, e.g. the heating element, to be moved/vibrated and to be damaged.

A second objective of the present invention is also to provide a liquid tank made of plastics material comprising the connecting device according to the invention.

The liquid tank made of plastics material for an automotive application according to the invention comprises an opening, a swirl pot arranged in an interior of the opening, wherein said swirl pot comprises a connecting device according to any one of the previous embodiments, wherein the flange of the connecting device is welded to an edge of the opening of the wall of the tank, outside said tank, said wall tank being the bottom wall of the tank, wherein the tubular member of the connecting device is in fluidic communication with the tank through an opening of the second end portion of the tubular member. The tank according to the invention has the ability of the tank to keep delivering the liquid it contains (fuel, urea solution) at low volumes to other parts of the vehicle such as the engine or the depollution system. The connecting device used in the tank according to the invention allows creating a swirl pot comprising a Liquid delivery Module adaptable to various tank dimensions. Moreover, a swirl pot having a tubular shape is more compact.

According to a preferred embodiment, the liquid tank according to the invention is such that the section of the tubular member between the second end portion and the flange has a diameter substantially equal to the diameter of the opening in the tank wall. A section of the tubular member between the second end portion substantially equal to the diameter of the opening in the tank wall permits to have an optimized swirl pot capacity.

According to a preferred embodiment, the liquid tank according to the invention is such that the angle α between a plan comprising the circumference of the upper part of the second end portion and a plan comprising the bottom wall of the tank is in the range of $0°≤α≤40°$, preferably in the range of $0°≤α≤30°$, more preferably in the range of $10°≤α≤20°$, even more preferably is equal to 16,7°. A swirl pot having a slopped upper part of the second end portion ensures a minimum volume of liquid close to the pump in some specific slopes of the car makes the filling of the swirl pot easier and keeps the highest wall oriented to fit to the most critical slope only. Moreover, the angle α between the plan comprising the circumference of the upper part of the second end portion and a plan comprising the bottom wall of the tank must be lower than or equal to 40°, preferably lower than or equal to 30°, such an angle permits to avoid a waste of useful volume of the swirl pot. The angle α depends on the diameter of the swirl pot which depends on the diameter of the pump. The angle α further depends on the minimum volume of liquid it is desired to keep in the swirl pot for a given maximum inclination of the tank.

According to a preferred embodiment, the liquid tank according to the invention is such that the angle α between a plan comprising the circumference of the upper part of the second end portion and a plan comprising the bottom wall of the tank is in the range of $0°<α≤40°$, preferably in the range of $0°<α≤30°$, more preferably in the range of $10°≤α≤20°$, even more preferably is equal to 16,7°. With such an angle, the ability to fill the swirl pot is optimized when the tank is sloped in perpendicular directions compared to the slit.

According to a preferred embodiment, the liquid tank according to the invention is such that the angle α between a plan comprising the circumference of the upper part of the second end portion and a plan comprising the bottom wall of the tank is equal to 0°. With such an angle, the internal volume of the swirl pot is optimized, as the wall of the swirl pot is as tall as it can be.

According to a preferred embodiment, the liquid tank according to the invention has a volume between 15 to 25 litres.

According to a preferred embodiment, the liquid tank according to the invention has an elongated shape, preferably with a ratio length/width superior to 3 and a ratio length/height superior to 5, and preferably has a length superior to 1 meter. The connecting device according to the invention is particularly useful with such a liquid tank, due to the fact that the swirl pot then ensure that a minimum volume of liquid remains usable to supply the pump of the Liquid Delivery Module, even if the tank has an elongated shape.

According to a preferred embodiment, the liquid tank according to the invention is such that the swirl pot has a volume between 0.3 to 5 litres. A swirl port having a volume comprised in the range of 0.3 to 5 litres permits to contain enough liquid to avoid a lack of fading of the other parts of the vehicle (i.e. engine or depollution system) and in the same time to permit a long-lasting welding of said swirl pot to the tank.

According to a preferred embodiment, the liquid tank according to the invention is such that the ratio between the length of the slit on the second end portion of the tubular member and the length of the wall of the swirl port is in the range of 0.4 to 0.8, preferably in the range of 0.4 to 0.7. By the expression "the length of the wall of the swirl port", we intend to mean the length between the highest point of the upper part of the second end portion of the tubular member and the flange. A length slit comprised in the range of 0.4 to 0.8, preferably in the range of 0.4 to 0.7, permits to select a slit swirl pot keeping the minimum volume of liquid inside said swirl pot for the most critical slope and having the lowest length needed. Those requirements might be in opposition so compromise must be found and such compromise might change from one tank to another.

According to a preferred embodiment, the liquid tank according to the invention is such that the direction of the slit on the second end portion of the tubular member is perpendicular to the plan comprising the bottom wall of the tank. A vertical slit permits to obtain a swirl pot having an efficiency of trapping the liquid less dependent of the slope.

According to a preferred embodiment, the liquid tank according to the invention is such that a Liquid Delivery Module is affixed to the first end portion of the tubular member of the connecting device forming a base of the swirl pot.

According to a preferred embodiment, the liquid tank according to the invention is such that the liquid to be contained in the liquid tank is an aqueous solution. Generally, the aqueous solution is demineralized water or a urea solution. Typically, the urea solution contains around 32.5% by weight high-purity urea (CAS number 57-13-6) and 67.5% by weight demineralized water. The high purity urea is defined according to the standard ISO 22241. An example of such ammonia aqueous solution is commercialized under the trademark Adblue®. By the expression "demineralized water", it has to be understood a deionized water solution having a conductivity lower than or equal to 1.0 μS/cm at 25° C. according to the standard ISO 3696:1987. An aqueous solution is preferred rather than a fuel because in a fuel tank it is preferred to have the pump entirely inside the tank rather than passing through the tank wall in order to avoid fuel leakage through a seal that could constitute a fire risk.

According to a preferred embodiment, the liquid tank according to the invention is such that it is made of polyethylene (PE) as well as the connecting device. Thus, the swirl pot can be easily welded to the wall of the liquid tank. In addition, a swirl pot made of polyethylene can withstand 100° C. and even more without been damaged. It is consequently particularly suitable for a liquid tank configured to contain an aqueous solution. In addition, this is particularly interesting when the Liquid Delivery Module comprises a heater.

According to a preferred embodiment, the liquid tank according to the invention is such that it is configured to be obtained by a blow molding process. Thus, the assembly of the connecting device that comprise a swirl pot is possible with a blow molded tank comprising an opening, because it is not possible to blow a swirl pot in a tank manufactured by blow molding.

A third objective of the present invention is to provide a manufacturing method of a liquid tank made of plastic material comprising said connecting device.

According to a preferred embodiment, the method for manufacturing a liquid tank made of plastics material for an automotive application according to the invention comprises the steps of:

Providing a tank made of plastic material;
Performing an opening in said tank;
Welding the connecting device according to the invention to the bottom wall of the tank via the flange;
Fixing the Liquid Delivery Module to the connecting device according to the invention.

The method according to the invention permits the manufacturing of liquid tank made of plastics material for an automotive application in flexible and adaptable way offering an adaptability of the swirl pot to the tank.

According to a preferred embodiment, the step of providing a tank made of plastic material is such that the tank is realized by a blow molding process.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
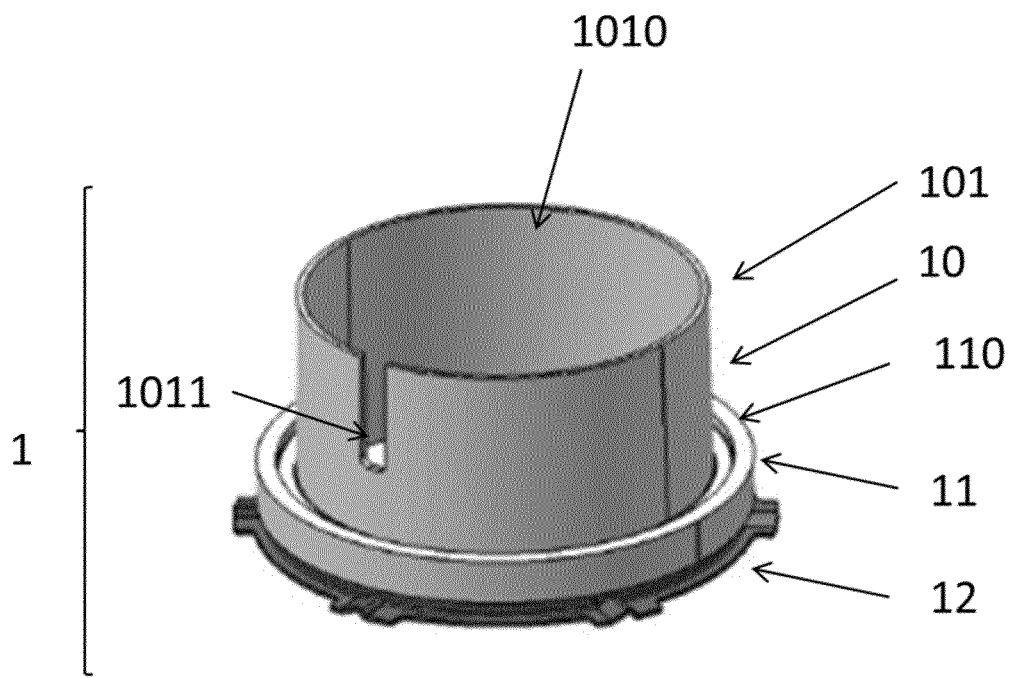
FIG. 1 is a side elevation of a first embodiment of a connecting device according to the invention.

In the different figures, the same reference signs refer to the same or analogous elements.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

FIG. 1 illustrates a first embodiment of a connecting device 1 between a liquid tank made of plastic material and a Liquid Delivery Module on board of a vehicle according to the invention. The connecting device 1 according to the invention comprises a tubular member 10 provided to be inserted into the liquid tank, said tubular member 10 having a first end portion not shown on the figure and a second end portion 101 provided to constitute a swirl pot, and a flange 11 located on the external part of the tubular member 10, a surface 110 of the flange 11 being provided to be welded to an external surface of a tank wall. The tubular member 10 has a circular section. The connecting device 1 comprises a connecting means 12 on the first end portion of the tubular member 10, said first end portion being located on the tubular member 10 relative to the flange 11 on the other side of the flange surface 110 provided to be welded to the liquid tank. The flange 11 is located close to the first end portion of the tubular member 10. The connecting means 1 provided for the fixing of the Liquid Delivery Module to the tubular member 10 is a cam-lock. The second end portion 101 of the tubular member 10 comprises an opening 1010 provided to allow entry of the liquid in the tubular member 10. The first end portion comprises an opening for the insertion of the Liquid Delivery Module. The second end portion 101 of the tubular member 10 comprises at least a slit 1011.

Figure 2:
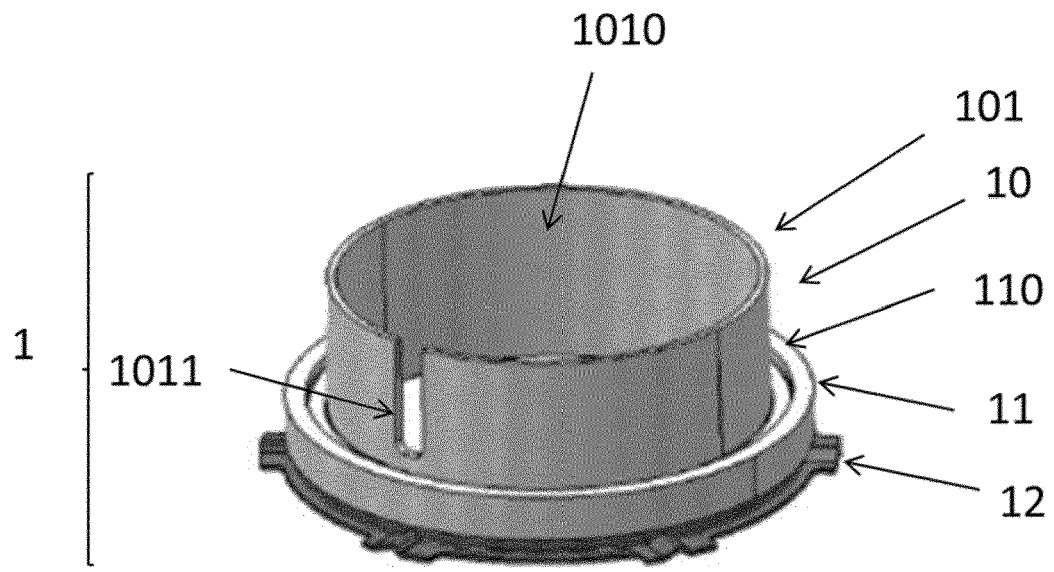
FIG. 2 is a side elevation of a second embodiment of a connecting device according to the invention.

FIG. 2 illustrates a second embodiment of a connecting device 1 between a liquid tank made of plastic material and a Liquid Delivery Module on board of a vehicle according to the invention. The connecting device 1 according to the invention comprises a tubular member 10 provided to be inserted into the liquid tank, said tubular member 10 having a first end portion not shown on the figure and a second end portion 101 provided to constitute a swirl pot, and a flange 11 located on the external part of the tubular member 10, a surface 110 of the flange 11 being provided to be welded to an external surface of a tank wall. The tubular member 10 has a circular section. The connecting device 1 comprises a connecting means 12 on the first end portion of the tubular member 10, said first end portion being located on the tubular member 10 relative to the flange 11 on the other side of the flange surface 110 provided to be welded to the liquid tank. The flange 11 is located close to the first end portion of the tubular member 10. The connecting means 1 provided for the fixing of the Liquid Delivery Module to the tubular member 10 is a cam-lock. The second end portion 101 of the tubular member 10 comprises an opening 1010 provided to allow entry of the liquid in the tubular member 10. The first end portion comprises an opening for the insertion of the Liquid Delivery Module. The second end portion 101 of the tubular member 10 comprises at least a slit 1011. The differences between the first embodiment illustrated on FIG. 1 and the one presented on FIG. 2 are:
- the length of the second end portion 101 of the tubular member 10 which is lower and will permit to obtain a swirl pot with a lower height inside the tank,
- the ratio between the distance between the highest point of the second end portion 101 of the tubular member 10 and the flange 11 and the length of the slit 1011 is lower than the ratio of the first embodiment.

Figure 3:
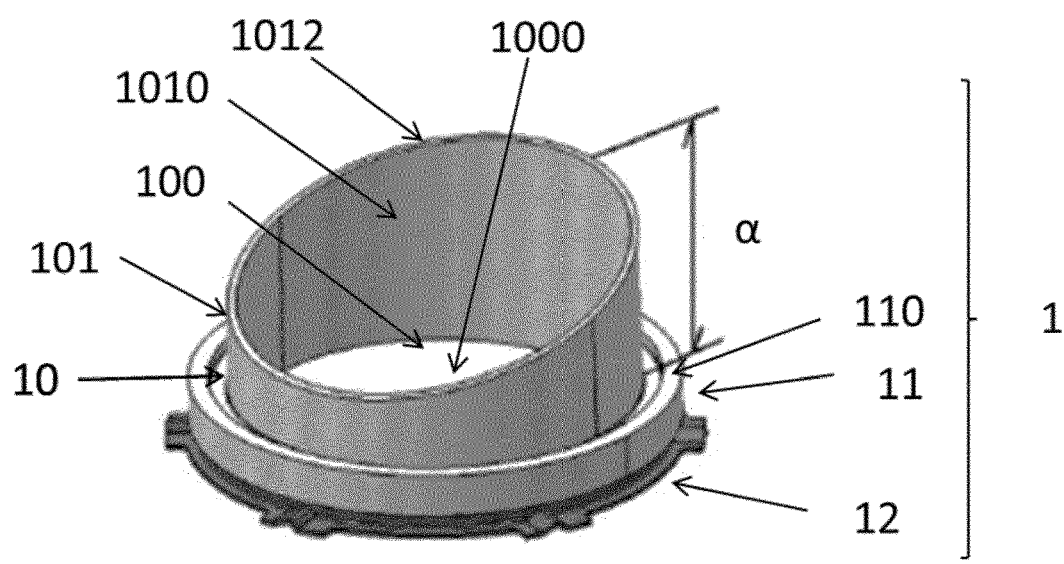
FIG. 3 is a side elevation of a third embodiment of a connecting device according to the invention.

FIG. 3 illustrates a third embodiment of a connecting device 1 between a liquid tank made of plastic material and a Liquid Delivery Module on board of a vehicle according to the invention. The connecting device 1 according to the invention comprises a tubular member 10 provided to be inserted into the liquid tank, said tubular member 10 having a first end portion 100 and a second end portion 101 provided to constitute a swirl pot, and a flange 11 located on the external part of the tubular member 10, a surface 110 of the flange 11 being provided to be welded to an external surface of a tank wall. The tubular member 10 has a circular section. The connecting device 1 comprises a connecting means 12 on the first end portion 100 of the tubular member 10, said first end portion 100 being located on the tubular member 10 relative to the flange 11 on the other side of the flange surface 110 provided to be welded to the liquid tank. The flange 11 is located close to the first end portion 100 of the tubular member 10. The connecting means 1 provided for the fixing of the Liquid Delivery Module to the tubular member 10 is a cam-lock. The second end portion 101 of the tubular member 10 comprises an opening 1010 provided to allow entry of the liquid in the tubular member 10. The first end portion 100 comprises an opening 1000 for the insertion of the Liquid Delivery Module. The second end portion 101 of the tubular member 10 comprises a sloped upper part 1012.

Figure 4:
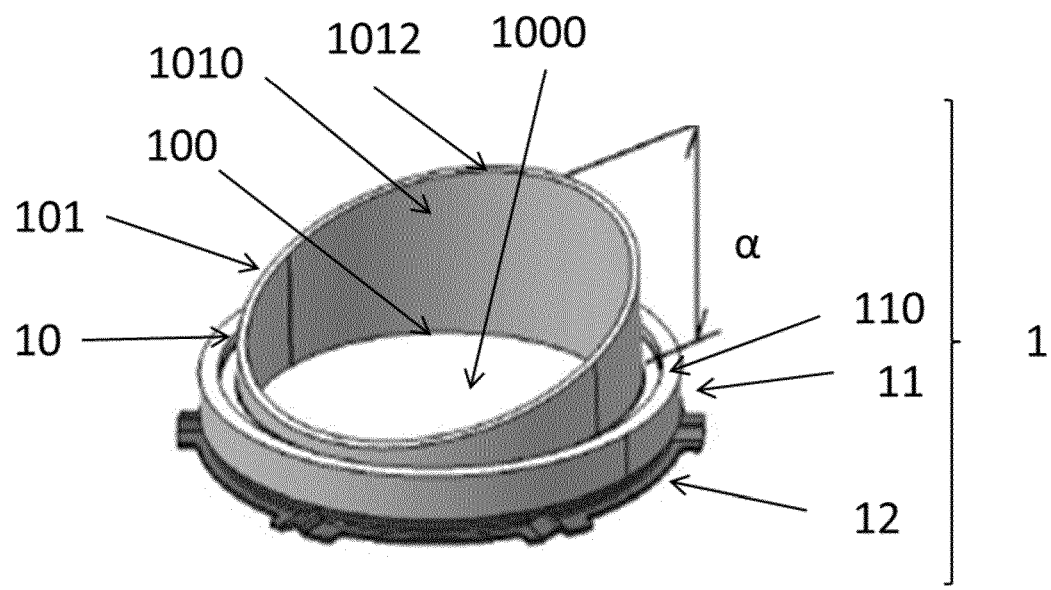
FIG. 4 is a side elevation of a fourth embodiment of a connecting device according to the invention.

FIG. 4 illustrates a fourth embodiment of a connecting device 1 between a liquid tank made of plastic material and a Liquid Delivery Module on board of a vehicle according to the invention. The connecting device 1 according to the invention comprises a tubular member 10 provided to be inserted into the liquid tank, said tubular member 10 having a first end portion 100 and a second end portion 101 provided to constitute a swirl pot, and a flange 11 located on the external part of the tubular member 10, a surface 110 of the flange 11 being provided to be welded to an external surface of a tank wall. The tubular member 10 has a circular section. The connecting device 1 comprises a connecting means 12 on the first end portion 100 of the tubular member 10, said first end portion 100 being located on the tubular member 10 relative to the flange 11 on the other side of the flange surface 110 provided to be welded to the liquid tank. The flange 11 is located close to the first end portion 100 of the tubular member 10. The connecting means 1 provided for the fixing of the Liquid Delivery Module to the tubular member 10 is a cam-lock. The second end portion 101 of the tubular member 10 comprises an opening 1010 provided to allow entry of the liquid in the tubular member 10. The first end portion 100 comprises an opening 1000 for the insertion of the Liquid Delivery Module. The second end portion 101 of the tubular member 10 comprises a sloped upper part 1012. The differences between the third embodiment illustrated on FIG. 3 and the one presented on FIG. 4 are:
- the angle α between a plan comprising the circumference of the upper part 1012 of the second end portion 110 and a plan comprising the surface 110 of the flange 11 being provided to be welded to an external surface of a tank wall flange,
- the distance between the highest point of the second end portion 101 of the tubular member 10 and the flange 12.

It is obvious that the angle α between a plan comprising the circumference of the upper part of the second end portion (101) and a plan comprising the bottom wall of the tank (2) is equivalent to the angle α between a plan comprising the circumference of the upper part 1012 of the second end portion 110 and a plan comprising the surface 110 of the flange 11 being provided to be welded to an external surface of a tank wall flange.
It is not be noted that in the embodiments illustrated on FIG. 1 and FIG. 2, the angle α between a plan comprising the circumference of the upper part of the second end portion 101 and a plan comprising the bottom wall of the tank 2 is equal to 0°.

Figure 5:
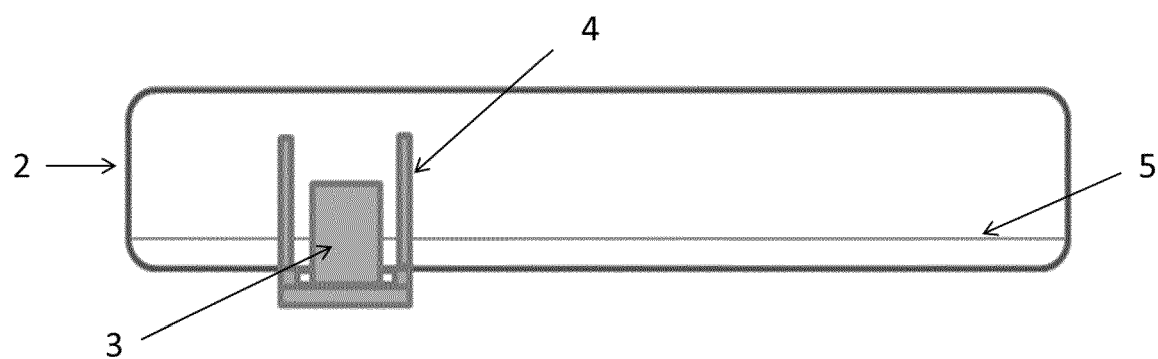
FIG. 5 is a vertical cross-section of a tank comprising a Liquid Delivery Module with a swirl pot.
Figure 6:
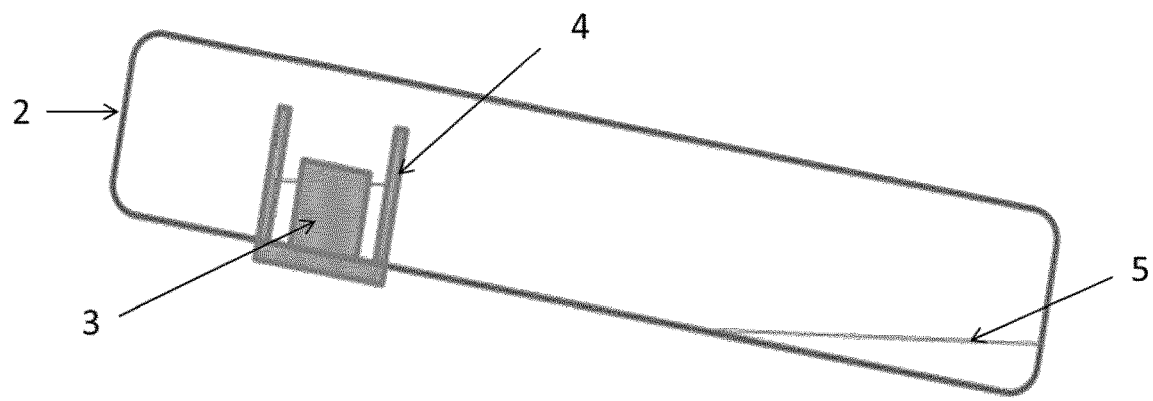
FIG. 6 is a vertical cross-section of a tank comprising a Liquid Delivery Module with a swirl pot on a sloping ground.

FIGS. 5 and 6 illustrate the role of a swirl pot 4 inside a tank made of plastic material 2 and its effect on the sustainability performance in the delivering of the liquid to the other parts of the vehicle by the Liquid Delivery Module 3. The Liquid Delivery Module 3 comprises a pump configured to pump liquid from the swirl pot 4 and to deliver it to a supply line, preferably via a hydraulic connector. Preferably, the Liquid Delivery Module 3 and/or the swirl pot 4 comprises a heating element, preferably a flexible heating element. For example, the Liquid Delivery Module 3 and/or the swirl pot 4 incorporates (that is to say, is equipped with) a heating element having at least one flexible part. The level of the liquid 5 inside the tank 2 depends on the slope of the ground but also on the movements of the vehicle. The swirl pot 4 permits to render the delivery of the liquid less dependent on the ground orientation and on the vehicle movements as shown on FIG. 6 by having a reserve of liquid near the Liquid Delivery Module 3 ready to be delivered. The swirl pot height must be as high as possible ensuring good sustainability performance on a sloping ground for example.

Figure 7:
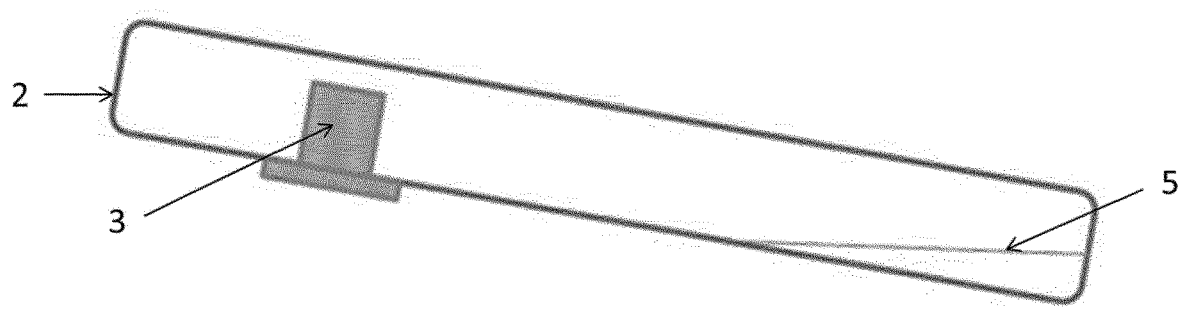
FIG. 7 is a vertical cross-section of a tank comprising a Liquid Delivery Module without swirl pot on a sloping ground.

FIG. 7 illustrates the effect of an absence of swirl pot on the ability of the Liquid Delivery Module 3 to deliver the liquid contained in the tank 2 and the influence of the slope of the ground on the presence of the liquid 5 near the Liquid Delivery Module 3.

Figure 8:
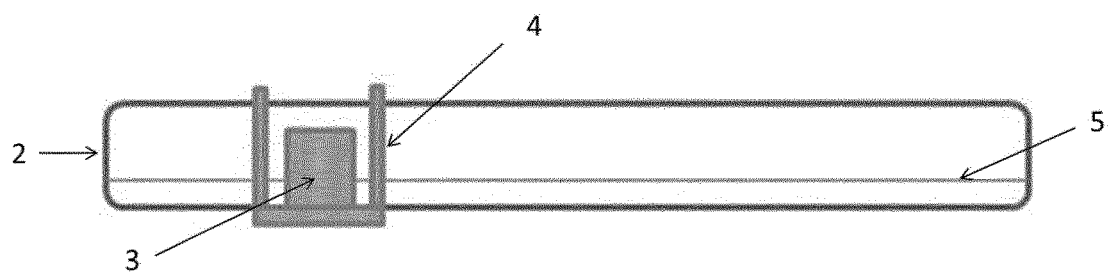
FIG. 8 is a vertical cross-section of a tank having a low height wherein a Liquid Delivery Module with a fixed design swirl pot is fixed.

FIG. 8 illustrates the limit of the use of a standardized swirl pot design 4 comprising a Liquid Delivery Module 3 which will not fit the dimensions of the tank 2, the height of the swirl pot 4 exceeding the height of the tank 2.

Figure 9:
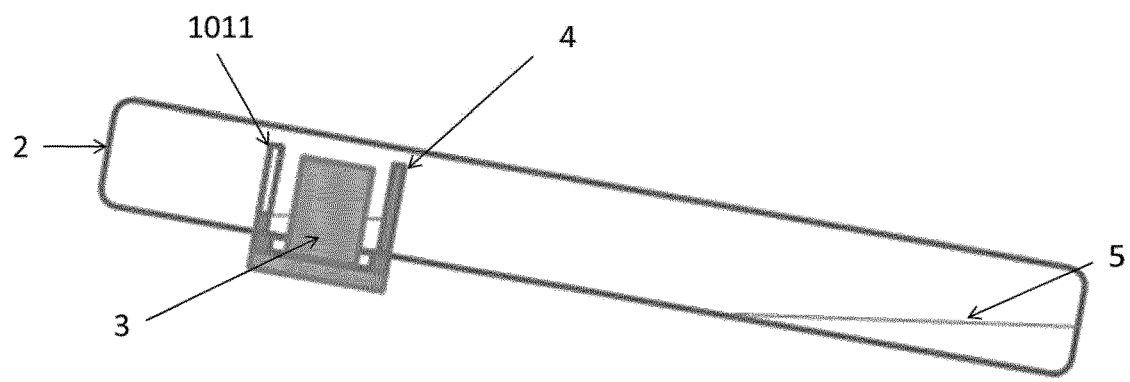
FIG. 9 is a vertical cross-section of a tank comprising a Liquid Delivery Module with a swirl pot having a slit on a sloping ground.
Figure 10:
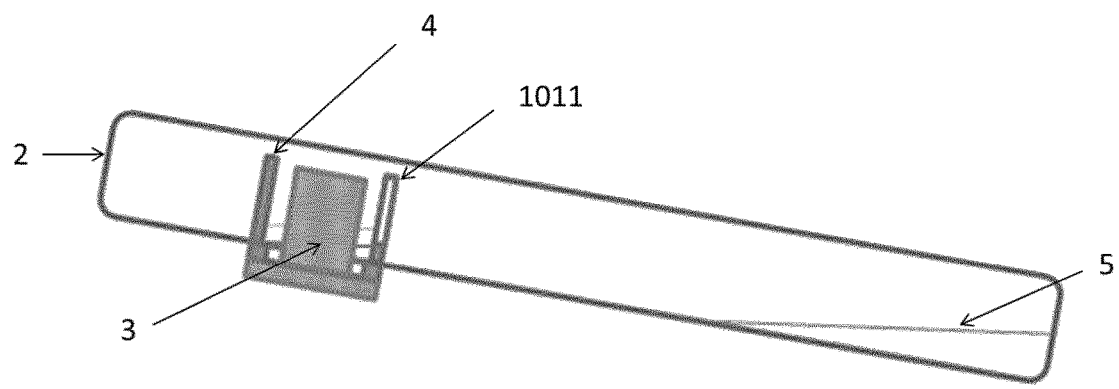
FIG. 10 is a vertical cross-section of a tank comprising a Liquid Delivery Module with a swirl pot having a slit on a sloping ground.

FIGS. 9 and 10 illustrate a swirl pot 4 comprising a slit 1011, said swirl pot 4 comprising a Liquid Delivery Module 3. The slit 1011 permits to overcome the problem of having a lower level of liquid 5 than the height of the swirl pot 4, said low level of liquid 5 leading to a fluidic disconnection of the inside of the swirl pot 3 with the tank 2. The slit 1011 position and its height is to be tailored for a specific tank application and is a compromise between a sustainable delivery performance and the limitation of the dynamic dead volume, i.e. the volume that cannot be suck by the pump of the Liquid Delivery Module 3 despite the movements of the liquid 5 inside the tank 2 generated by the movement of the vehicle and/or the slope of the ground. The slit 1011 must be oriented in the less critical direction regarding the liquid level 5 inside the tank 2.

Figure 11:
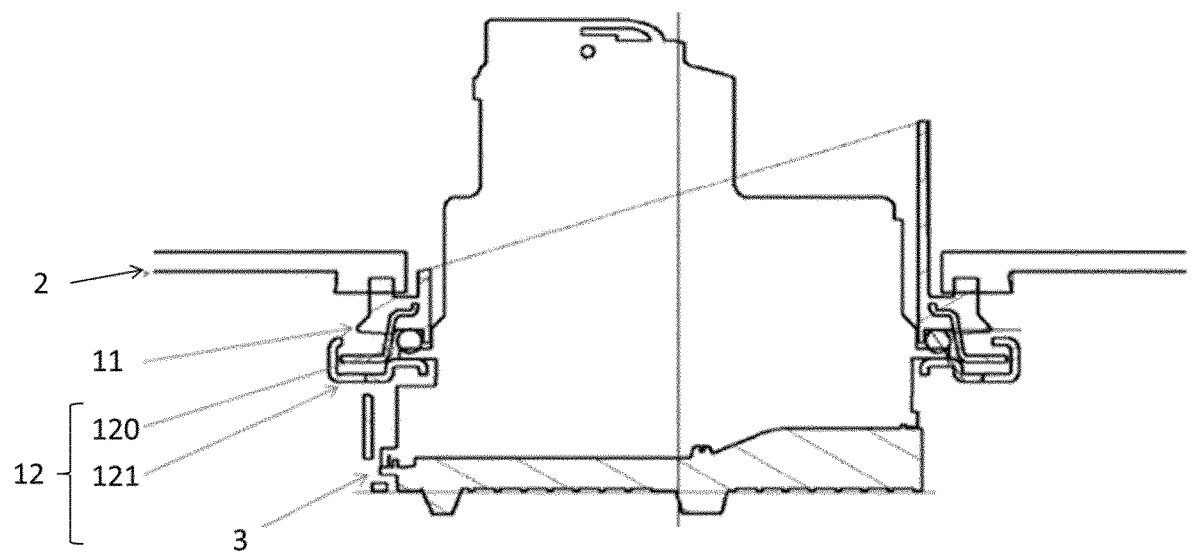
FIG. 11 is a vertical cross-section of a first embodiment of a tank according to the invention presenting the connections between the Liquid Delivery Module and the connecting device according to the invention and the welding of the connecting device to the tank.

FIG. 11 illustrates a vertical cross-section of a first embodiment of tank 2 according to the invention presenting the connections between the Liquid Delivery Module 3 and the connecting device 1 according to the invention and the welding of the connecting device 1 to the tank made of plastics material 2. The flange 11 of the connecting device according to the invention is welded to an edge of the opening of the bottom wall of the tank 2. The tubular member of the connecting device 1 is in fluidic communication with the tank 2 through an opening of the second end portion of the tubular member. A Liquid Delivery Module 3 is affixed to the first end portion of the tubular member of the connecting device 1 forming a base of the swirl pot 4. The Liquid Delivery Module 3 is fixed to the connecting means 12 located on the first end portion of the tubular member, said first end portion being located on the tubular member relative to the flange 11 on the other side of the flange surface provided to be welded to the liquid tank 2. The connecting means comprises an assembly means comprising a seal which is an O-ring 120 and a L-ring 121.

Figure 12:
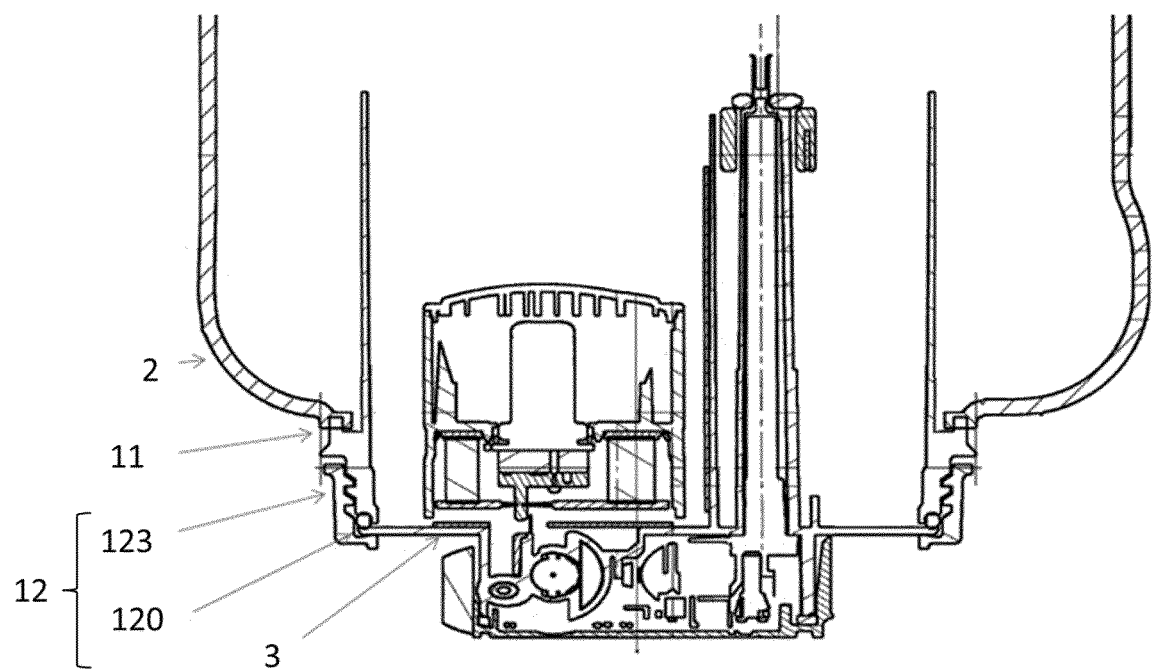
FIG. 12 is a vertical cross-section of a second embodiment of a tank according to the invention presenting the connections between the Liquid Delivery Module and the connecting device according to the invention and the welding of the connecting device to the tank.

FIG. 12 illustrates a vertical cross-section of second embodiment of a tank 2 according to the invention presenting the connections between the Liquid Delivery Module 3 and the connecting device 1 according to the invention and the welding of the connecting device 1 to the tank made of plastics material 2. The flange 11 of the connecting device according to the invention is welded to an edge of the opening of the bottom wall of the tank 2. The tubular member of the connecting device 1 is in fluidic communication with the tank 2 through an opening of the second end portion of the tubular member. A Liquid Delivery Module 3 is affixed to the first end portion of the tubular member of the connecting device 1 forming a base of the swirl pot 4. The Liquid Delivery Module 3 is fixed to the connecting means 12 located on the first end portion of the tubular member, said first end portion being located on the tubular member relative to the flange 11 on the other side of the flange surface provided to be welded to the liquid tank 2. The connecting means comprises an assembly means comprising a seal which is an O-ring 120 and a lock nut 123.

Figure 13:
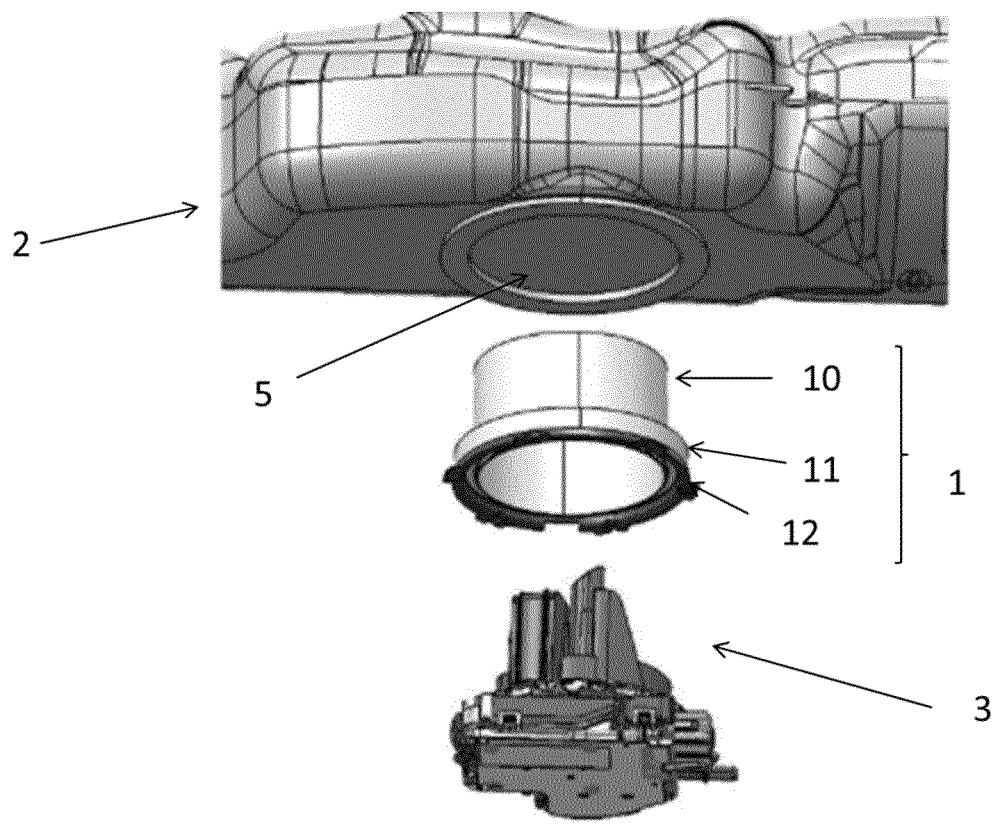
FIG. 13 is an enlarged fragmentary view showing more details of the tank according to the invention.

FIG. 13 is an enlarged fragmentary view showing more detail of the tank 2 according to the invention. The liquid tank made of plastics material 2 for an automotive application comprises an opening 5, a swirl pot is arranged in an interior of the opening 5, wherein said swirl pot comprises a connecting device 1 according to the invention. The connecting device 1 comprises a tubular member 10 provided to be inserted into the liquid tank 2. The tubular member 10 has a first end portion and a second end portion provided to constitute the swirl pot and a flange 11 located on the external part of the tubular member 10, a surface of the flange 11 being provided to be welded to an external surface of a tank wall 2. The connecting device 1 comprises a connecting means 12 on the first end portion of the tubular member, said first end portion being located on the tubular member 10 relative to the flange 11 on the other side of the flange surface provided to be welded to the liquid tank 2. The connecting means 1 is provided for the fixing of the Liquid Delivery Module 3 to the tubular member 10, the second end portion of the tubular member 10 comprising an opening provided to allow entry of the liquid in the tubular member. The first end portion comprises an opening provided for the insertion of the Liquid Delivery Module 3.

Figure 14:
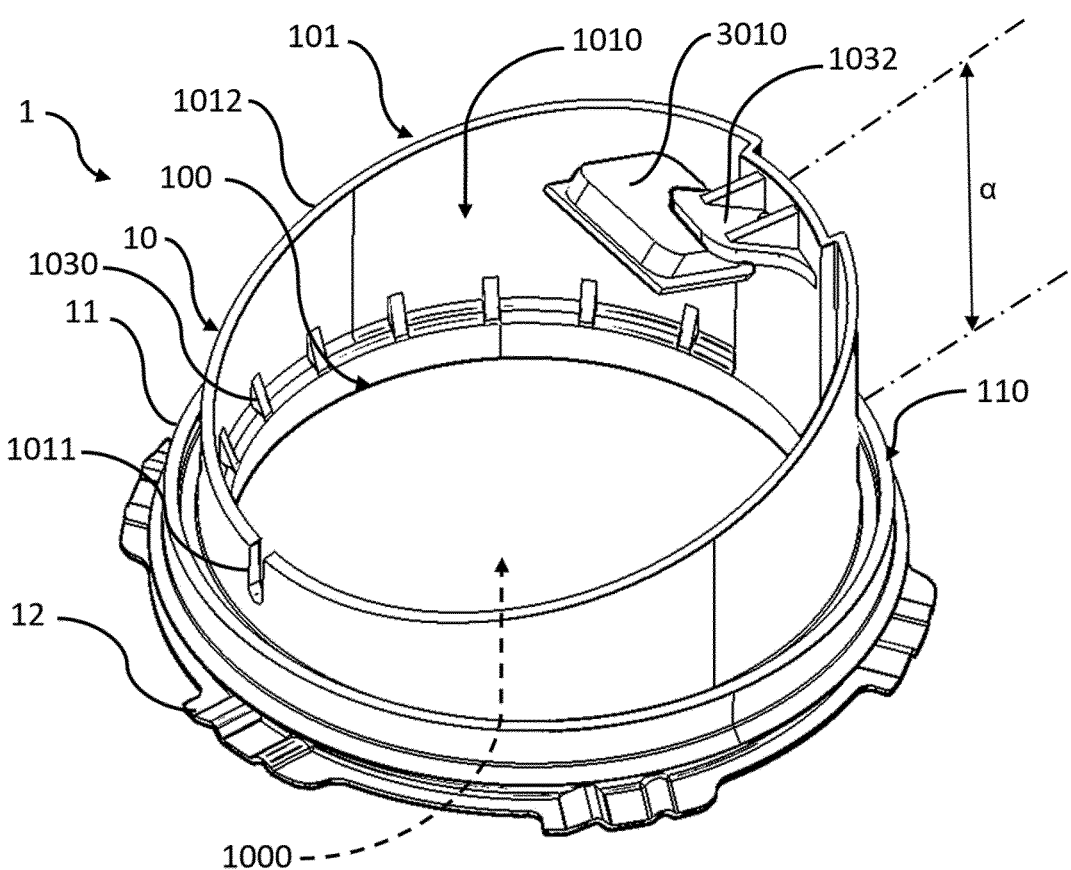
FIG. 14 is a side elevation of a fifth embodiment of a connecting device according to the invention and of a part of a Liquid Delivery Module.

FIG. 14 illustrates a fifth embodiment of a connecting device 1 between a liquid tank made of plastic material and a Liquid Delivery Module on board of a vehicle according to the invention. The connecting device 1 according to the invention comprises a tubular member 10 provided to be inserted into the liquid tank, said tubular member 10 having a first end portion 100 and a second end portion 101 provided to constitute a swirl pot 4, and a flange 11 located on the external part of the tubular member 10, a surface 110 of the flange 11 being provided to be welded to an external surface of a tank wall. The tubular member 10 has a circular section or approximately a circular section. The connecting device 1 comprises a connecting means 12 on the first end portion 100 of the tubular member 10, said first end portion 100 being located on the tubular member 10 relative to the flange 11 on the other side of the flange surface 110 provided to be welded to the liquid tank. The flange 11 is located close to the first end portion 100 of the tubular member 10. The connecting means 12 provided for the fixing of the Liquid Delivery Module to the tubular member 10 is a cam-lock. The second end portion 101 of the tubular member 10 comprises an opening 1010 provided to allow entry of the liquid in the tubular member 10. The first end portion 100 comprises an opening 1000 for the insertion of the Liquid Delivery Module. The second end portion 101 of the tubular member 10 comprises a slit 1011 and a sloped upper part 1012. The angle α between a plan comprising the circumference of the upper part 1012 of the second end portion 110 and a plan comprising the surface 110 of the flange 11 being provided to be welded to an external surface of a tank wall flange is equal to 16,7°. Moreover, the internal diameter of the first end portion 100 is smaller than the internal diameter of the swirl pot, i.e. of the second end portion 101. The internal diameter of the swirl pot is for example approximatively 128 mm, and the internal diameter of the first end portion is for example approximatively 121 mm. A plurality of ribs 1030 are provided between the internal diameter of the first end portion and the internal diameter of the second end portion 101. The second end portion 101 further comprises an upper mechanical protection means, for example an abutment or a finger 1032. Those upper mechanical protection means are provided to protect a part of the Liquid Delivery Module 3, this part being preferably a heating element 3010, which heating element 3010 has preferably at least one flexible part.

The method used to manufacture the tank 2 according to the invention shown on FIG. 13 comprises the steps of:
Providing a tank made of plastic material 2, e.g. by a blow molding process;
Performing an opening 5 in said tank 2;
Welding the connecting device 1 according to the invention to the bottom wall of the tank 2 via the flange 11;
Fixing the Liquid Delivery Module 3 to the connecting device 1 according to the invention.

In the previous embodiments, the liquid tank 2 is such that it is preferably made of polyethylene (PE) as well as the connecting device 1.

The liquid tank 2 is such that the liquid to be contained in the liquid tank 2 is an aqueous solution. Generally, the aqueous solution is demineralized water or a urea solution. The liquid tank 2 has for example a volume between 15 to 25 litres. For example, the liquid tank 2 has an elongated shape, preferably with a ratio length/width superior to 3 and a ratio length/height superior to 5, and preferably has a length superior to 1 meter.

In the previous embodiments, the swirl pot 4 may comprise a heating means.

For example, the swirl pot 4 may include electrical heating elements, which are embedded in the material of the swirl pot 4, thus permitting to heat the liquid inside and outside the swirl pot 4. Thus, the swirl pot 4 is multilayered and one of the layers accommodates electrical heating elements, or electrical heating elements are embedded in at least one of the layers. For example, a plastic layer equipped with a heating conductor material is extrusion-coated with a polyethylene (PE) material. If the plastic layer is also made of polyethylene, there is a secure connection between the plastic layer and the extrusion coating and an optimization of the desired heat transfer. For example, the electrical heating conductor is fixed on the plastic layer by embroidery. In this respect, the heating conductor may be a textile.

Alternatively, the swirl pot 4 may comprise, preferably made of, a PTC (Positive Temperature Coefficient) plastic material, thus permitting to heat the liquid inside and outside the swirl pot 4. By providing electrodes so that the PTC plastic material is set at least partially between two electrodes, the PTC plastic material may provide heat by electrically supplying the electrodes.

The invention claimed is:

1. A connecting device configured to mount a liquid delivery module to a liquid tank made of plastic material on board of a vehicle, the connecting device comprising:
a tubular member configured to be inserted into a liquid tank opening of the liquid tank to constitute a swirl pot, the tubular member having a first end portion and a second end portion opposed to each other, a second end portion opening being configured to allow entry of liquid in the tubular member, and a first end portion opening being configured to receive the liquid delivery module;

a flange located on an external part of the first end portion;

a first flange surface configured to be welded, outside the liquid tank, to an external edge of the liquid tank opening, such that, in operation, the first flange surface directly contacts the external edge of the liquid tank opening; and a second flange surface comprising a connector that fixes the liquid delivery module to the first end portion opening, the connector being a reversible assembly comprising a seal such that the liquid delivery module is dismountable from the liquid tank.

2. The connecting device of claim 1, wherein the reversible assembly comprising the seal is selected from the group consisting of a mason jar, a cam-lock, and an inverted cam-lock.

3. The connecting device of claim 1, wherein the second end portion of the tubular member comprises a slit and/or a sloped upper part.

4. The connecting device of claim 1, wherein the tubular member has a circular section.

5. A liquid tank made of plastic material for an automotive application, the liquid tank comprising:

an opening in a bottom wall of the liquid tank; and the connecting device according to claim 1, the tubular member of the connecting device being arranged in an interior of the opening in the bottom wall of the liquid tank to constitute a swirl pot, wherein the flange of the first end portion of the connecting device is welded to an edge of the opening in the bottom wall of the liquid tank, outside the liquid tank, wherein the second end portion opening of the connecting device is in fluidic communication with the liquid tank, and wherein the first end portion opening of the connecting device is configured to be closed by fixing with the connector a liquid delivery module in the first end portion opening of the connecting device to form a base of the swirl pot in the first end portion of the connecting device.

6. The liquid tank of claim 5, wherein the swirl pot has a volume in a range of from 0.3 to 5 liters.

7. The liquid tank of claim 5, wherein the second end portion of the tubular member comprises a slit, and wherein a ratio between a slit length on the second end portion of the tubular member and a wall length of the swirl pot is in a range of from 0.4 to 0.8.

8. The liquid tank of claim 5, wherein the second end portion of the tubular member comprises a slit, and wherein a slit direction on the second end portion of the tubular member is perpendicular to the plane comprising the bottom wall of the liquid tank.

9. The liquid tank of claim 5, wherein the angle a between a plane comprising the circumference of an upper part of the second end portion and a plane comprising the bottom wall of the liquid tank is in a range of $0°<a<40°$.

10. The liquid tank of claim 9, wherein the angle a is in a range of from $10°<a<20°$.

11. The liquid tank of claim 5, wherein the angle a between a plane comprising the circumference of an upper part of the second end portion and a plane comprising the bottom wall of the liquid tank is equal to $0°$.

12. The connecting device of claim 1, wherein a section of the tubular member between the second end portion and the flange has a diameter substantially equal to a diameter of the opening in the liquid tank wall.

13. A method for manufacturing a liquid tank comprising plastic material, suitable for an automotive application, the method comprising:

performing an opening in a bottom wall of the liquid tank comprising the plastic material;

inserting the second end portion of the connecting device of claim 1 in the opening of the bottom wall of the liquid tank until the flange of the first end portion of the connecting device abuts against the bottom wall of the liquid tank;

welding the flange of the first end portion of the connecting device to the bottom wall of the liquid tank;

inserting the liquid delivery module in the opening of the first end portion of the connecting device; and fixing by the connector the liquid delivery module to first end portion of the connecting device.

14. The connecting device of claim 1, wherein the flange is tubular, an end of the flange being the first flange surface, an opposite end of the flange being the second flange surface.

15. The connecting device of claim 1, wherein the connector comprises an O-ring and a lock nut.

16. The connecting device of claim 1, wherein the seal is located in a direction of extension of the tubular member at an outer edge of the first end portion.

* * * * *